G. T. LEWIS.

PROCESS OF DESULPHURIZING AND VOLATILIZING SILVER-LEAD ORES.

No. 7,448. Reissued Dec. 26, 1876.

Witnesses

W. R. Wright

W. C. Strawbridge

By

Inventor

George T. Lewis by George Harding

Attorney.

UNITED STATES PATENT OFFICE.

GEORGE T. LEWIS, OF PHILADELPHIA, PENNSYLVANIA.

IMPROVEMENT IN PROCESSES OF DESULPHURIZING AND VOLATILIZING SILVER LEAD ORES.

Specification forming part of Letters Patent No. 116,604, dated July 4, 1871; reissue No. 7,448, dated December 26, 1876; application filed August 3, 1876.

*To all whom it may concern:*

Be it known that I, GEORGE T. LEWIS, of the city of Philadelphia, State of Pennsylvania, have invented a new and useful Process of Desulphurizing and Volatilizing Silver Lead Ores; and I do hereby declare the following is a full, clear, and exact description of the same, reference being had to the annexed drawing, making a part of this specification, in which—

Figure 1:
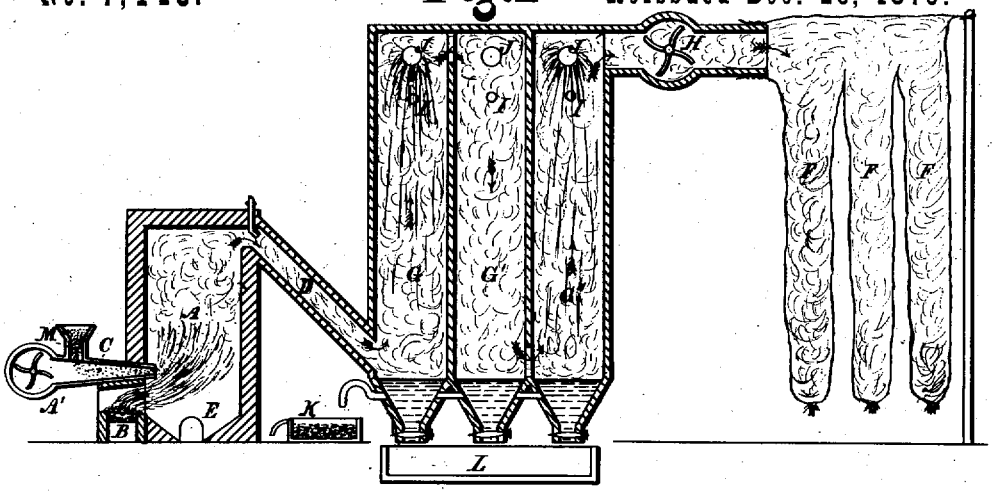
Figure 2:
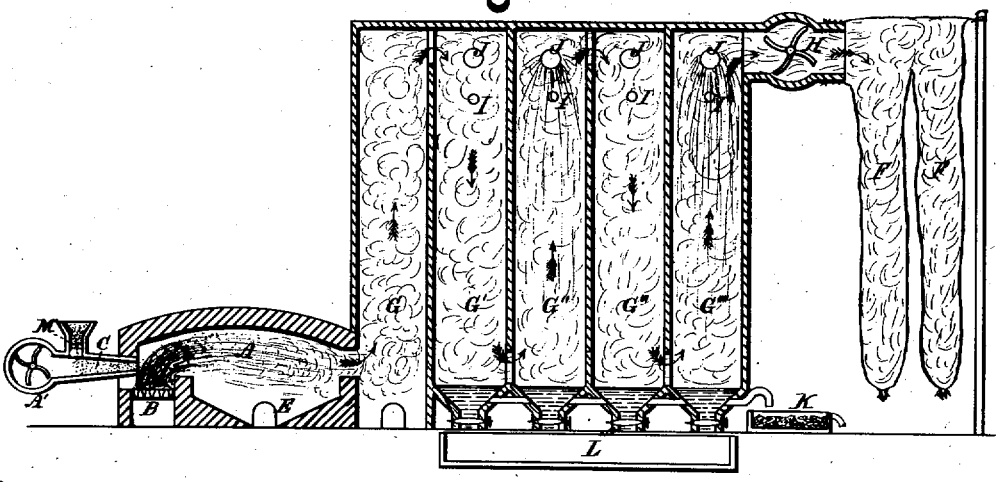

Figure 1 is a longitudinal section of an apparatus in which my process can be used, and I term it the "dry process." Fig. 2 is a modification of the same.

The nature of my process consists in pulverizing the ore, and then feeding it in small quantities into an upright flue, and forcing it through the flame of a lateral furnace by an air-blast connected with said flue. The silver is carried by the blast of air from the blower through the flame, is separated, and falls to the bottom of the flue and chambers beyond, while the lead-ore vapors pass on to collecting-bags.

To enable others skilled in the art to make and use my invention, I will describe its construction and operation.

In the drawing, A, Fig. 1, is an upright flue; A′, a blower; B, a lateral furnace; C, the pulverized ore, which is fed in proper quantities, regulated by a pair of revolving rollers, M; D, a lateral flue connecting flue A with the tower G; E, the point in the flue where silver and any undecomposed lead and silver ores are collected. F are the bags where the lead fumes are collected. G, G′, G″, &c., are intermediate towers leading between the furnace and the bags, to collect the silver and to cool the lead fumes in their passage to the bags. H is a blower to increase the draft between the furnace and the bags. I are steam-jets, which steam assists in condensing the gases accompanying the fumes, and assists in rendering more soluble the sulphate and sulphide of silver, which are deposited in the chambers or towers. J are iron pipes, perforated with holes, which, when fed with water, will create a rain or shower of water down the chambers or towers for the purpose of cooling them, besides condensing the steam, absorbing the gases, and assisting in collecting the silver. These showers can be regulated at will in all the towers. K is a trough or box filled with lime to receive the overflow and to decompose any sulphate or sulphide of silver held in solution. L is a settling-cistern.

As the pulverized ore C falls in contact with the flames the lead vaporizes and passes over with the smoke and products of combustion, its course being marked by the arrows in the drawing. The silver is carried over mechanically with the current and through the lateral flue D by the exhaust-blower, and drops, by reason of its gravity, in the tower A at E, or in the lower parts of the towers G, G′, G″, &c., while the lead fumes pass along through the towers G G′ G″, and are caught in the closed bags F F F, where they are strained, the gases passing off and the oxide or salts of lead remaining in the bags.

I do not limit myself to the precise form of apparatus hereinbefore given, as it may be variously modified.

Having thus described my invention, what I claim as new, and desire to secure by Letters Patent, is—

1. The process of vaporizing and desulphurizing lead ores bearing silver, or silver lead ores, and separating the silver therefrom, which consists in submitting the pulverized ore to the direct action of a flame, and separating the silver by its gravity and solubility and collecting the oxide or salts of lead in bags.

2. In combination with a furnace for the production of silver from argentiferous lead ores, of a bag or series of bags for arresting and collecting the oxide and salts of lead from the escaping fumes.

GEORGE T. LEWIS.

Witnesses:
JOHN JOLLEY,
OWEN DARCY.